United States Patent
Lim

(10) Patent No.: US 11,875,539 B2
(45) Date of Patent: Jan. 16, 2024

(54) PARTIAL ACCESS METADATA FOR VIDEO-BASED POINT CLOUD COMPRESSION DATA

(71) Applicant: Samsung Electronics Co., Ltd., Suwon-si (KR)

(72) Inventor: Youngkwon Lim, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 419 days.

(21) Appl. No.: 17/108,918

(22) Filed: Dec. 1, 2020

(65) Prior Publication Data
US 2021/0287405 A1 Sep. 16, 2021

Related U.S. Application Data

(60) Provisional application No. 63/003,425, filed on Apr. 1, 2020, provisional application No. 62/990,252, filed on Mar. 16, 2020.

(51) Int. Cl.
*G06T 9/00* (2006.01)
*G06T 3/40* (2006.01)
(Continued)

(52) U.S. Cl.
CPC ............... *G06T 9/001* (2013.01); *G06T 3/40* (2013.01); *G06T 17/00* (2013.01); *G06V 20/64* (2022.01);
(Continued)

(58) Field of Classification Search
CPC .......... G06T 9/001; G06T 3/40; G06T 17/00; G06V 20/64; G06V 30/1437;
(Continued)

(56) References Cited

U.S. PATENT DOCUMENTS

2018/0315248 A1 11/2018 Bastov et al.
2019/0318488 A1 10/2019 Lim et al.
(Continued)

FOREIGN PATENT DOCUMENTS

| WO | 2019115866 A1 | 6/2019 |
| WO | 2020013454 A1 | 1/2020 |
| WO | 2020013567 A1 | 1/2020 |

OTHER PUBLICATIONS

International Search Report and Written Opinion of the International Searching Authority in connection with International Application No. PCT/KR2021/003177 dated Jun. 25, 2021, 10 pages.

(Continued)

*Primary Examiner* — Christopher M Brandt

(57) ABSTRACT

A decoding device, method, and computer readable medium for partial access metadata for video-based point cloud compression data are disclosed. The decoding device for point cloud decoding includes a communication interface and a processor operably coupled to the communication interface. The communication interface receives a compressed bitstream and metadata related to the compressed bitstream. The processor identifies, in the metadata, region information that indicates a region of a point cloud based on a user perspective; locates a track of the compressed bitstream that corresponds to the region information; identifies, in the track, objects corresponding to the region of the point cloud; and decodes for display of an object, included in the objects identified in the track, that is visible from the user perspective.

20 Claims, 7 Drawing Sheets

(51) Int. Cl.
*G06T 17/00* (2006.01)
*G06V 30/146* (2022.01)
*G06V 30/14* (2022.01)
*G06V 20/64* (2022.01)
*H04L 65/70* (2022.01)
*H04L 65/75* (2022.01)

(52) U.S. Cl.
CPC ........ *G06V 30/147* (2022.01); *G06V 30/1437* (2022.01); *H04L 65/70* (2022.05); *H04L 65/75* (2022.05)

(58) Field of Classification Search
CPC .... G06V 30/147; G06V 10/147; G06V 10/25; H04L 65/70; H04L 65/75; H04L 65/61; H04L 65/764; H04N 19/597; H04N 21/42202; H04N 21/4728; H04N 21/816; H04N 21/84; H04N 21/85406
See application file for complete search history.

(56) References Cited

U.S. PATENT DOCUMENTS

| | | | |
|---|---|---|---|
| 2020/0014905 A1 | 1/2020 | Oh | |
| 2020/0226792 A1* | 7/2020 | Wang | G06T 7/0002 |
| 2020/0296350 A1* | 9/2020 | Oh | H04N 13/161 |
| 2020/0296397 A1* | 9/2020 | Wang | H04N 19/44 |
| 2021/0279945 A1* | 9/2021 | Bae | H04N 21/234363 |
| 2022/0215616 A1* | 7/2022 | Huang | G06V 10/25 |

OTHER PUBLICATIONS

Extended European Search Report dated Jul. 7, 2023 regarding Application No. 21772552.2, 11 pages.

Takahashi et al., "[PCC-Systems] Evaluation results for CE on Immersive Media Metadata", ISO/IEC JTC1/SC29/ WG11, MPEG2020/M52965, Apr. 2020, 6 pages.

Huang et al., "Spatial Region Descriptor for V-PCC Preselection", ISO/IEC JTC1/SC29/WG11, MPEG2019/M52263v2, Jan. 2020, 9 pages.

"Description of Core Experiment on Immersive Media Metadata",ISO/IEC JTC1/SC29/WG11, N19033, Feb. 2020, 7 pages.

"Draft text of ISO/IEC Dis 23090-10 Carriage of Video-based Point Cloud Compression Data", ISO/IEC JTC1/SC29/ WG11, N19066, Feb. 2020, 46 pages.

Takahashi et al., "(34.1) [PCC-Systems] On visibility cone information indication in system layer", ISO/IEC JTC1/ SC29/WG11, MPEG2020/M54355, Jun. 2020, 10 pages.

* cited by examiner

PARTIAL ACCESS METADATA FOR VIDEO-BASED POINT CLOUD COMPRESSION DATA

CROSS-REFERENCE TO RELATED APPLICATION AND CLAIM OF PRIORITY

This application claims priority under 35 U.S.C. § 119(e) to U.S. Provisional Patent Application No. 62/990,252 filed on Mar. 16, 2020 and U.S. Provisional Patent Application No. 63/003,425 filed on Apr. 1, 2020. The above-identified provisional patent applications are hereby incorporated by reference in its entirety.

TECHNICAL FIELD

This disclosure relates generally to compression and coding of volumetric multimedia data. More specifically, this disclosure relates to an apparatus and a method for partial access metadata for video-based point cloud compression data.

BACKGROUND

Three hundred sixty-degree (360°) video is emerging as a new way of experiencing immersive video due to the ready availability of powerful handheld devices such as smartphones. 360° video enables immersive "real life," "being there" experience for consumers by capturing the 360° view of the world. Users can interactively change their viewpoint and dynamically view any part of the captured scene or object they desire. Display and navigation sensors can track head movement of the user in real-time to determine the region of the 360° video that the user wants to view. Multimedia data that is three-dimensional (3D) in nature, such as point clouds are can be used in the immersive environment.

SUMMARY

This disclosure provides patch splitting for partial access metadata for video-based point cloud compression.

In one embodiment, a decoding device for partial access metadata for video-based point cloud compression data is provided. The decoding device includes a communication interface and a processor operably coupled to the communication interface. The communication interface is configured to receive a compressed bitstream and metadata related to the compressed bitstream. The decoding device includes a processor configured to identify, in the metadata, region information that indicates a region of a point cloud based on a user perspective; locate a track of the compressed bitstream that corresponds to the region information; and decode for display of an object, included in the objects identified in the track, that is visible from the user perspective.

In another embodiment, a method for generating partial access metadata for video-based point cloud compression data is provided. The method includes receiving, using a communication interface, a compressed bitstream and metadata related to the compressed bitstream; identifying, using a processor operably coupled to the communication interface, region information in the metadata that indicates a region of a point cloud based on a user perspective; locating a track of the compressed bitstream that corresponds to the region information; identifying, in the track, objects corresponding to the region of the point cloud; and decoding for display of an object, included in the objects identified in the track, that is visible from the user perspective.

In another embodiment, a non-transitory computer readable medium embodying a computer program for generating partial access metadata for video-based point cloud compression data is provided. The computer program comprising computer readable program code that, when executed by a processor of an electronic device, causes the electronic device to receive a compressed bitstream and metadata related to the compressed bitstream; identify, in the metadata, region information that indicates a region of a point cloud based on a user perspective; locate a track of the compressed bitstream that corresponds to the region information; identify, in the track, objects corresponding to the region of the point cloud; and decode for display of an object, included in the objects identified in the track, that is visible from the user perspective.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
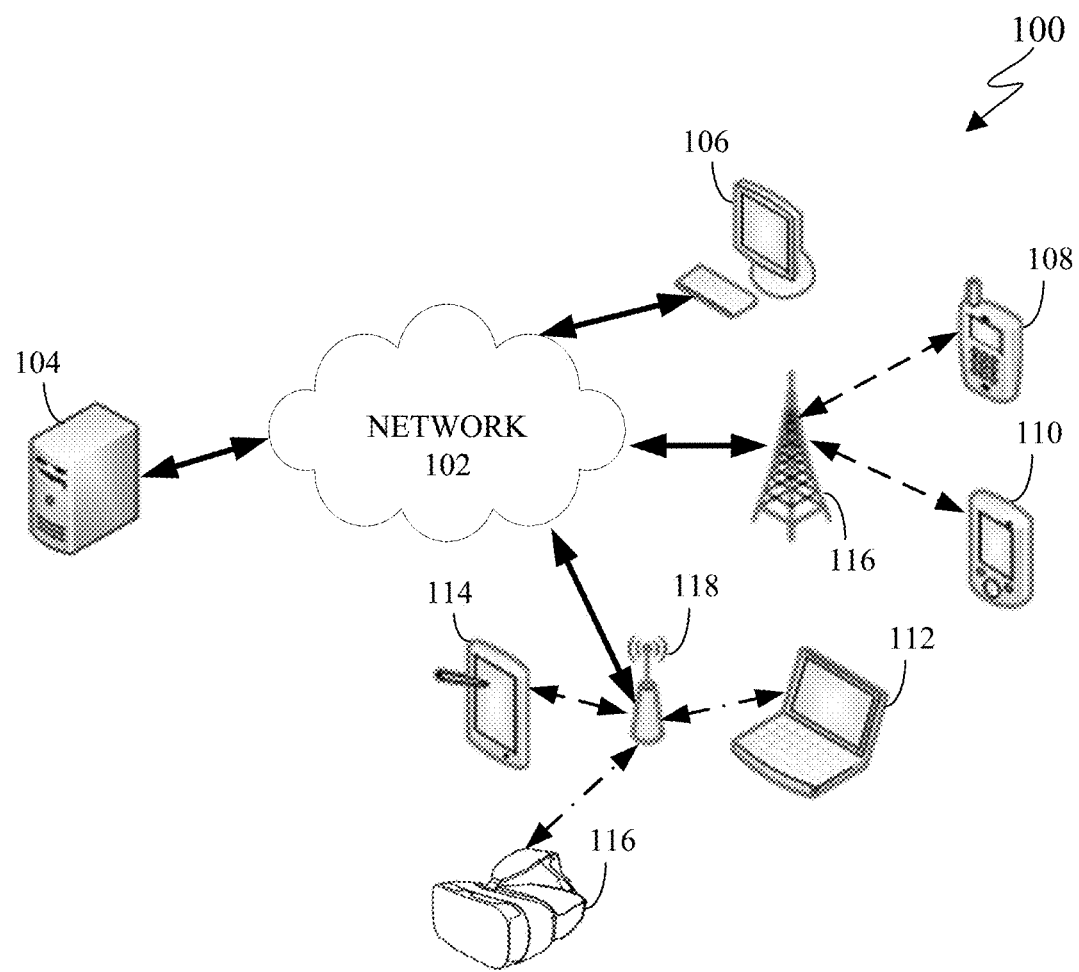
FIG. 1 illustrates an example communication system in accordance with an embodiment of this disclosure.

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

A point cloud is a set of 3D points along with attributes such as color and point-size that represent an object's surface or volume. Point clouds are common in a variety of applications such as gaming, 3D maps, visualizations, medical applications, augmented reality, virtual reality, autonomous driving, multi-view replay, 6DoF immersive media, to name a few.

Video/Image-based point cloud compression systems, such as the MPEG-I Video-based Point Cloud Compression (VPCC) reference model, project points from 3D space to 2D spaces creating patches (for both geometry and texture), which are stored in video frames and encoded using codecs for regular video/image compression. The video/image frame size is determined by the size of the patches and how tightly they can be packed in the video frame. Large size patches lead to inefficient packing and increased frame size. The increase in frame size, in turn, increases the codec complexity. Additionally, the increased frame size also increases the encoded bitstream size. Both of these effects are undesirable from compression systems' standpoint. Moreover, the increase in complexity and bitstream size is even more objectionable for video-based point cloud compression systems, since the added complexity and bitstream size does not add to any significant increase in quality of the reconstructed point cloud.

Augmented reality (AR) is an interactive experience of a real-world environment where objects that reside in the real-world environment are augmented with virtual objects, virtual information, or both. Virtual reality (VR) is a rendered version of a visual scene, where the entire scene is computer generated. In certain embodiments, AR and VR include both visual and audio experiences. A visual rendering is designed to mimic the visual stimuli, and if available audio sensory stimuli, of the real world as naturally as possible to an observer or user as the user moves within the limits defined by the application or the AR or VR scene. For example, VR places a user into immersive worlds that respond to the head movements of a user. At the video level, VR is achieved by providing a video experience that covers as much of the field of view (FOV) as possible together with the synchronization of the viewing angle of the rendered video with the head movements.

Many different types of devices are able to provide the immersive experience associated with AR or VR. One example device is a head-mounted display (HMD). An HMD is a device that enables a user to view the VR scene and adjust the displayed content based on movements of the head of the user. An HMD represent one of many types of devices that provide AR and VR experiences to a user. Typically, an HMD relies either on a dedicated screen that is integrated into a device and connected with an external computer (tethered) or on a device, such as a smartphone, that is inserted into the HMD (untethered). The first approach utilizes one or more lightweight screens and benefits from a high computing capacity. In contrast, the smartphone-based systems utilize higher mobility and can be less expensive to produce. In both instances, the video experience generated is the same. It is noted that as used herein, the term "user" may denote a human or another device (such as an artificial intelligent electronic device) using the electronic device.

A point cloud is a virtual representation of an object in three dimensions. For example, a point cloud is a collection of points in 3D space, and each point that is positioned in a particular position within 3D space and includes one or more attributes or textures. A point cloud can be similar to a virtual object in a VR or AR environment. A point mesh is another type of a virtual representation of an object in a VR or AR environment. A point cloud or a point mesh can be an object, multiple objects, a virtual scene (which includes multiple objects), and the like. Point clouds are commonly used in a variety of applications, including gaming, 3D mapping, visualization, medicine, AR, VR, autonomous driving, multi-view replay, 6 degrees of freedom immersive media, to name a few.

Point clouds represent volumetric visual data. In certain embodiments, the points are positioned on the external surface of the object. In certain embodiments, the points are positioned throughout the internal structure and external surfaces of the object. Point clouds consist of numerous points positioned in 3D space. Each point in a 3D point cloud includes an attribute such as a geometric position, represented by 3-tuple (X,Y,Z) coordinate values and can include one or more textures. The location of each point within in a 3D environment or space is identified by the three coordinates (X,Y,Z). Additionally, each point in the point cloud can also include additional textures such as color, reflectance, intensity, surface normal, and the like. A texture can refer to an attribute other than the geometry attribute. A single point of a 3D point cloud can have multiple attributes. For example, a first attribute can represent the geometric position of a point (such as a location of the point in 3D space), while a second attribute or texture can represent the color of the point, a third attribute or texture can represent the reflectiveness of the point, and yet the point can further include additional attributes or textures such as intensity, surface normal, and the like. In some embodiments, an attribute refers only to a texture of a point, and not a geometric position of the points. In some applications, point clouds can also be used to approximate light field data in which, each point includes multiple view-dependent, color information (R, G, B triplets).

A single point cloud can include billions of points, with each point associated with a geometric position and one or more attributes. A geometric position and each additional attribute that is associated with a point occupy a certain number of bits. For example, a geometric position of a single point in a point cloud can consume thirty bits. For instance, if each geometric position of a single point is defined with an X value, a Y value, and a Z value, then each coordinate (the X, the Y, and the Z) uses ten bits, totaling the thirty bits. Similarly, a texture corresponding to the color of a point cloud can consume twenty-four bits. For instance, if a color component of a single point is defined based on a Red value, Green value, and Blue value, then each color component (Red, Green, and Blue) uses eight bits, totaling the twenty-four bits. As a result, a single point with a ten-bit geometric attribute data, per coordinate, and an eight-bit color attribute data, per color value, occupies fifty-four bits. Each additional attribute increases the bits required for a single point. If a frame includes one million points, the number of bits per frame is fifty-four million bits (fifty-four bits per point times one million points per frame). If the frame rate is thirty frames per second and undergoes no compression, then 1.62 gigabytes per second (fifty-four million bits per frame times thirty frames per second) are to be transmitted from one electronic device to another in order for the second device to display the point cloud. Therefore, transmitting an uncompressed point cloud from one electronic device to another uses significant bandwidth due to the size and complexity of the data associated with a single point cloud. As a result, the point cloud is compressed prior to the transmission.

Embodiments of the present disclosure take into consideration that compressing a point clouds is necessary to expedite and improve transmission of the point cloud from one device (such as a source device) to another device (such as a display device) due to the bandwidth necessary to transmit the point cloud. Certain dedicated hardware components can be used to meet the real-time demands or reduce delays or lags in the transmitting and rendering a 3D point cloud; however, such hardware components are often expensive. Additionally, many video codecs are not able to encode and decode 3D video content, such as a point cloud. Compressing and decompressing a point cloud by leveraging existing 2D video codecs enables the encoding and decoding of a point cloud to be widely available without the need for new or specialized hardware. According to embodiments of the present disclosure, leveraging existing video codecs can be used to compress and reconstruct a point cloud, when the point cloud is converted from a 3D state to a 2D state. In certain embodiments, the conversion of a point cloud includes projecting the clusters of points of the 3D point cloud onto 2D frames by creating patches that represent the point cloud. Thereafter, video codecs such as HEVC, AVC, VP9, VP8, JVNET, and the like can be used to compress the 2D frames representing the 3D point cloud similar to a 2D video.

An encoder projects the 3D point cloud onto the multiple 2D frames and generates a bitstream. The encoder or another device then transmits the bitstream to different device. The frames can be compressed by leveraging various video compression codecs, image compression codecs, or both. A decoder receives the bitstream, decompresses the bitstream into the frames, and reconstructs the point cloud based on the information within the frames. After the point cloud is reconstructed, the 3D point cloud can be rendered and displayed for a user to observe. In certain embodiments, frames representing different attributes (including the geometric positions of the points) are encoded and decoded separately. In other embodiments, frames representing different attributes (including the geometric positions of the points) are encoded and decoded together.

One of the important goal of the CE on Immersive Media Metadata established at the 129th MPEG meeting is to find a harmonized solution between partial access technologies defined in ISO/IEC 23090-10 and volumetric tiling information supplemental enhancement information (SEI) messages defined in ISO/IEC 23090-5 as both defines relationship between subset of coded bitstream and 3D regions.

This Specification analyzes both technologies regarding their main purpose, processing model and information signaled to better understand similarities and differences and propose a harmonized solution so that they can be used as one set instead of disassociated duplicated information provided in two different standards.

Partial access technology specified in the section 8 of N19066, draft DIS of 23090-10 mainly provide static/dynamic 3D spatial regions in a point cloud object and their respective associated tracks information so that the application delivering and/or rendering a V-PCC bitstream can easily identify subset of it. As described in the section 3.1.1 of N19033, Description of Core Experiment on Immersive Media Metadata, a main use case of such technology is to provide support for identifying one or more 3D spatial sub-regions to be rendered according to the user's location, viewport, field of view, etc. In contrast, according to N19156, Report on scalability features in V-PCC, volumetric tiling information SEI message in DIS of 23090-5 specifies a set of two-dimensional (2D) rectangles on the V-PCC atlas, labelling them and associating them with a variety of useful information including relationship of the coded data in 2D rectangle regions and the point cloud in 3D space. This SEI message has been developed to support use cases described in the section 3.1.2 and 3.1.2. In addition, N19156 describes that such information can be used for a user or application to determine which types of information need to be extracted before decoding or reconstructed to achieve various scalability, such as viewpoint or region of interest scalability and complexity scalability.

As there is some similarity in use cases to be supported by both technologies, there are some overlaps, but large portion of the information signaled by them are quite different as the processing models behind each are not same. Table 1 summarizes the similarity and difference of the two technologies.

|  |  | VPCCSpatialRegionsBox | Volumetric tiling SEI |
| --- | --- | --- | --- |
|  | Main use case | efficient access of coded data according to the 3D region to be rendered | useful information about the 2D region on the V-PCC atlas including their relationship with points cloud in 3D space |
| processing model | Location processing entity | moov (file metadata) file parser | mdat (bitstream) V-PCC bitstream parser |
|  | Granularity | track in a file | object (2D rectangle on the V-PCC atlas) |
| information provided | Persistency | update (timed metadata track) | update (individual), cancel (all or individual) |
|  | synchronization | explicit (timestamp) | implicit (location) |
|  | Label | 3D region id | object id human readable description |
|  | 2D bounding box | None | atlas top, left, width, height |
|  | 3D bounding box | anchor (x, y, z), cuboid (dx, dy, dz) | origin (x, y, z), delta (x, y, z) |
|  | priority | None | vti_object_priority_value |
|  | show/hide | None | vti_object_hidden_flag |
|  | collision | None | vti_object_collision_shape_id |
|  | dependency | None | vti_object_dependency_idx |

As described in the previous section, a main difference between the two technologies come from the processing model. VPCCSpatialRegionBox is defined as a part of the metadata for a file track so that the file parser to identify the file tracks according to the 3D region required by a user or an application. But volumetric tiling SEI messages are defined as part of the bitstream to identify 2D regions in the coded picture according to the various needs. Therefore, the best way of harmonization is to preserve the nature of the technologies so that the appropriate information can be provided to each processing entities, e.g. file parser and bitstream parser, and the relationship between two sets of information can be easily identified and maintained throughout the entire process to enable some type of hierarchical processing model.

Considering one file track can include more than one 2D rectangle regions on the V-PCC atlas without losing coding efficiency and parsing of track metadata and selection of a track always happen before parsing or SEI messages embedded in the bitstream, the most efficient way of using both VPCCSpatialRegionBox and volumetric tiling SEI messages is to associate information about more coarsely defined subsets of the bitstream with the former as a superset of the information provided by the latter. In other words, a 3D region defined VPCCSpatialRegionBox should provide information covering all the 3D points to be reconstructed from the coded data of the 2D rectangular regions defined by volumetric tiling SEI messages in the bitstream of associated track group. In addition, VPCCSpatialRegionBox should include the list of object ids of the 2D rectangular regions in the bitstream of associated track group so that a user or an application can identify the file tracks without parsing SEI messages. In the same sense, DynamicSpatialRegionSample also needs to include the list of object ids for dynamic update.

FIG. 1 illustrates an example communication system 100 in accordance with an embodiment of this disclosure. The embodiment of the communication system 100 shown in FIG. 1 is for illustration only. Other embodiments of the communication system 100 can be used without departing from the scope of this disclosure.

The communication system 100 includes a network 102 that facilitates communication between various components in the communication system 100. For example, the network 102 can communicate IP packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

In this example, the network 102 facilitates communications between a server 104 and various client devices 106-116. The client devices 106-116 may be, for example, a smartphone, a tablet computer, a laptop, a personal computer, a wearable device, a HMD, or the like. The server 104 can represent one or more servers. Each server 104 includes any suitable computing or processing device that can provide computing services for one or more client devices, such as the client devices 106-116. Each server 104 could, for example, include one or more processing devices, one or more memories storing instructions and data, and one or more network interfaces facilitating communication over the network 102. As described in more detail below, the server 104 can transmit a compressed bitstream, representing a point cloud, to one or more display devices, such as a client device 106-116. In certain embodiments, each server 104 can include an encoder.

Each client device 106-116 represents any suitable computing or processing device that interacts with at least one server (such as the server 104) or other computing device(s) over the network 102. The client devices 106-116 include a desktop computer 106, a mobile telephone or mobile device 108 (such as a smartphone), a PDA 110, a laptop computer 112, a tablet computer 114, and an HMD 116. However, any other or additional client devices could be used in the communication system 100. Smartphones represent a class of mobile devices 108 that are handheld devices with mobile operating systems and integrated mobile broadband cellular network connections for voice, short message service (SMS), and Internet data communications. The HMD 116 can display a 360° scene including one or more 3D point clouds. In certain embodiments, any of the client devices 106-116 can include an encoder, decoder, or both. For example, the mobile device 108 can record a video and then encode the video enabling the video to be transmitted to one of the client devices 106-116. In another example, the laptop computer 112 can be used to generate a virtual 3D point cloud, which is then encoded and transmitted to one of the client devices 106-116.

In this example, some client devices 108-116 communicate indirectly with the network 102. For example, the mobile device 108 and PDA 110 communicate via one or more base stations 118, such as cellular base stations or eNodeBs (eNBs). Also, the laptop computer 112, the tablet computer 114, and the HMD 116 communicate via one or more wireless access points 120, such as IEEE 802.11 wireless access points. Note that these are for illustration only and that each client device 106-116 could communicate directly with the network 102 or indirectly with the network 102 via any suitable intermediate device(s) or network(s). In certain embodiments, the server 104 or any client device 106-116 can be used to compress a point cloud, generate a bitstream that represents the point cloud, and transmit the bitstream to another client device such as any client device 106-116.

In certain embodiments, any of the client devices 106-114 transmit information securely and efficiently to another device, such as, for example, the server 104. Also, any of the client devices 106-116 can trigger the information transmission between itself and the server 104. Any of the client devices 106-114 can function as a VR display when attached to a headset via brackets, and function similar to HMD 116. For example, the mobile device 108 when attached to a bracket system and worn over the eyes of a user can function similarly as the HMD 116. The mobile device 108 (or any other client device 106-116) can trigger the information transmission between itself and the server 104.

In certain embodiments, any of the client devices 106-116 or the server 104 can create a 3D point cloud, compress a 3D point cloud, transmit a 3D point cloud, receive a 3D point cloud, render a 3D point cloud, or a combination thereof. For example, the server 104 can then compress 3D point cloud to generate a bitstream and then transmit the bitstream to one or more of the client devices 106-116. For another example, one of the client devices 106-116 can compress a 3D point cloud to generate a bitstream and then transmit the bitstream to another one of the client devices 106-116 or to the server 104.

Although FIG. 1 illustrates one example of a communication system 100, various changes can be made to FIG. 1. For example, the communication system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
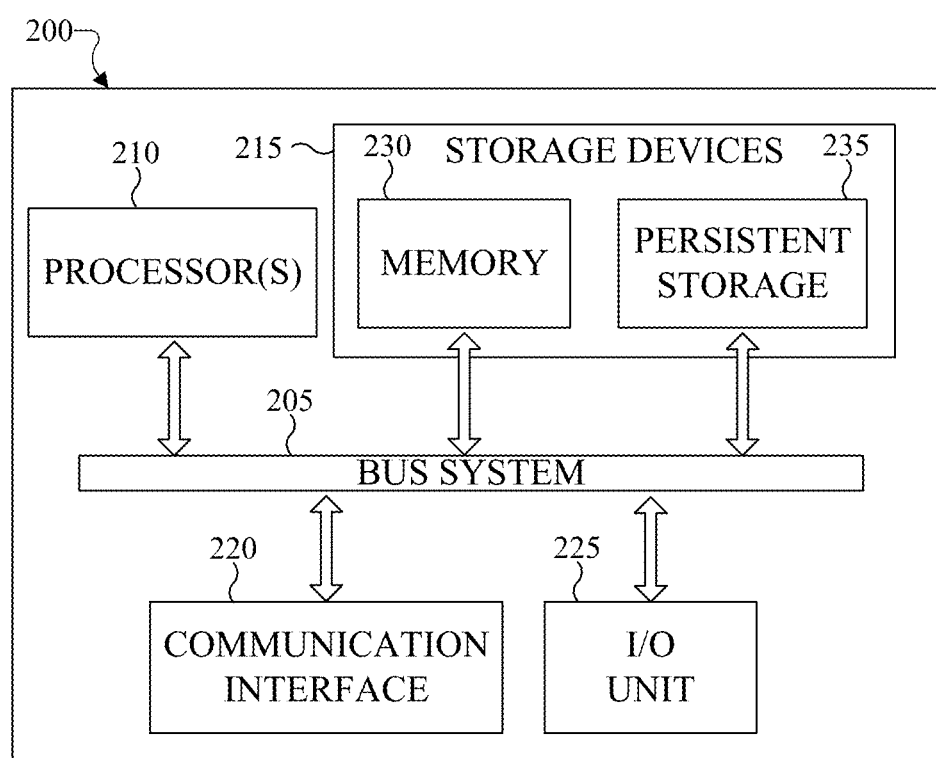
FIGS. 2 and 3 illustrate example electronic devices in accordance with an embodiment of this disclosure.
Figure 3:
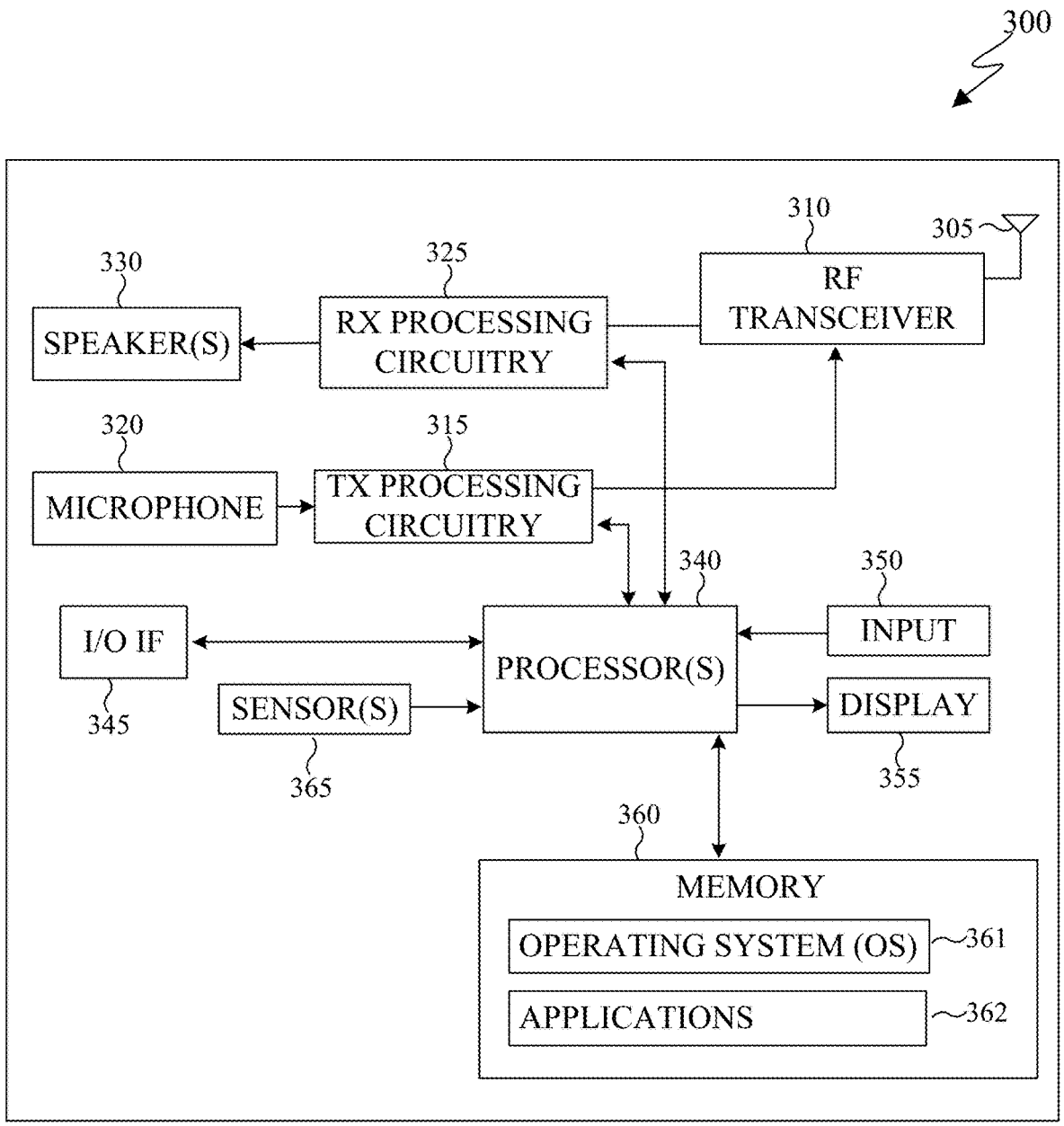

FIGS. 2 and 3 illustrate example electronic devices in accordance with an embodiment of this disclosure. In particular, FIG. 2 illustrates an example server 200, and the server 200 could represent the server 104 in FIG. 1. The server 200 can represent one or more encoders, decoders, local servers, remote servers, clustered computers, and components that act as a single pool of seamless resources, a cloud-based server, and the like. The server 200 can be accessed by one or more of the client devices 106-116 of FIG. 1 or another server.

The server 200 can represent one or more local servers, one or more compression servers, or one or more encoding servers, such as an encoder. In certain embodiments, the encoder can perform decoding. As shown in FIG. 2, the server 200 includes a bus system 205 that supports communication between at least one processing device (such as a processor 210), at least one storage device 215, at least one communications interface 220, and at least one input/output (I/O) unit 225.

The processor 210 executes instructions that can be stored in a memory 230. The processor 210 can include any suitable number(s) and type(s) of processors or other devices in any suitable arrangement. Example types of processors 210 include microprocessors, microcontrollers, digital signal processors, field programmable gate arrays, application specific integrated circuits, and discrete circuitry. In certain embodiments, the processor 210 can encode a 3D point cloud stored within the storage devices 215. In certain embodiments, encoding a 3D point cloud also decodes the 3D point cloud to ensure that when the point cloud is reconstructed, the reconstructed 3D point cloud matches the 3D point cloud prior to the encoding.

The memory 230 and a persistent storage 235 are examples of storage devices 215 that represent any structure(s) capable of storing and facilitating retrieval of information (such as data, program code, or other suitable information on a temporary or permanent basis). The memory 230 can represent a random-access memory or any other suitable volatile or non-volatile storage device(s). For example, the instructions stored in the memory 230 can include instructions for decomposing a point cloud into patches, instructions for packing the patches on 2D frames, instructions for compressing the 2D frames, as well as instructions for encoding 2D frames in a certain order in order to generate a bitstream. The instructions stored in the memory 230 can also include instructions for rendering a 360° scene, as viewed through a VR headset, such as HMD 116 of FIG. 1. The persistent storage 235 can contain one or more components or devices supporting longer-term storage of data, such as a read only memory, hard drive, Flash memory, or optical disc.

The communications interface 220 supports communications with other systems or devices. For example, the communications interface 220 could include a network interface card or a wireless transceiver facilitating communications over the network 102 of FIG. 1. The communications interface 220 can support communications through any suitable physical or wireless communication link(s). For example, the communications interface 220 can transmit a bitstream containing a 3D point cloud to another device such as one of the client devices 106-116.

The I/O unit 225 allows for input and output of data. For example, the I/O unit 225 can provide a connection for user input through a keyboard, mouse, keypad, touchscreen, or other suitable input device. The I/O unit 225 can also send output to a display, printer, or other suitable output device. Note, however, that the I/O unit 225 can be omitted, such as when I/O interactions with the server 200 occur via a network connection.

Note that while FIG. 2 is described as representing the server 104 of FIG. 1, the same or similar structure could be used in one or more of the various client devices 106-116. For example, a desktop computer 106 or a laptop computer 112 could have the same or similar structure as that shown in FIG. 2.

FIG. 3 illustrates an example electronic device 300, and the electronic device 300 could represent one or more of the client devices 106-116 in FIG. 1. The electronic device 300 can be a mobile communication device, such as, for example, a mobile station, a subscriber station, a wireless terminal, a desktop computer (similar to the desktop computer 106 of FIG. 1), a portable electronic device (similar to the mobile device 108, the PDA 110, the laptop computer 112, the tablet computer 114, or the HMD 116 of FIG. 1), and the like. In certain embodiments, one or more of the client devices 106-116 of FIG. 1 can include the same or similar configuration as the electronic device 300. In certain embodiments, the electronic device 300 is an encoder, a decoder, or both. For example, the electronic device 300 is usable with data transfer, image or video compression, image or video decompression, encoding, decoding, and media rendering applications.

As shown in FIG. 3, the electronic device 300 includes an antenna 305, a radio-frequency (RF) transceiver 310, transmit (TX) processing circuitry 315, a microphone 320, and receive (RX) processing circuitry 325. The RF transceiver 310 can include, for example, a RF transceiver, a BLUETOOTH transceiver, a WI-FI transceiver, a ZIGBEE transceiver, an infrared transceiver, and various other wireless communication signals. The electronic device 300 also includes a speaker 330, a processor 340, an input/output (I/O) interface (IF) 345, an input 350, a display 355, a memory 360, and a sensor(s) 365. The memory 360 includes an operating system (OS) 361, and one or more applications 362.

The RF transceiver 310 receives, from the antenna 305, an incoming RF signal transmitted from an access point (such as a base station, WI-FI router, or BLUETOOTH device) or other device of the network 102 (such as a WI-FI, BLUETOOTH, cellular, 5G, LTE, LTE-A, WiMAX, or any other type of wireless network). The RF transceiver 310 down-converts the incoming RF signal to generate an intermediate frequency or baseband signal. The intermediate frequency or baseband signal is sent to the RX processing circuitry 325 that generates a processed baseband signal by filtering, decoding, and/or digitizing the baseband or intermediate frequency signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data from the processor 340. The outgoing baseband data can include web data, e-mail, or interactive video game data. The TX processing circuitry 315 encodes, multiplexes, and/or digitizes the outgoing baseband data to generate a processed baseband or intermediate frequency signal. The RF transceiver 310 receives the outgoing processed baseband or intermediate frequency signal from the TX processing circuitry 315 and up-converts the baseband or intermediate frequency signal to an RF signal that is transmitted via the antenna 305.

The processor 340 can include one or more processors or other processing devices. The processor 340 can execute instructions that are stored in the memory 360, such as the OS 361 in order to control the overall operation of the electronic device 300. For example, the processor 340 could control the reception of forward channel signals and the transmission of reverse channel signals by the RF transceiver 310, the RX processing circuitry 325, and the TX processing circuitry 315 in accordance with well-known principles. The processor 340 can include any suitable number(s) and type(s) of processors or other devices in any suitable arrangement. For example, in certain embodiments, the processor 340 includes at least one microprocessor or microcontroller. Example types of processor 340 include microprocessors, microcontrollers, digital signal processors, field programmable gate arrays, application specific integrated circuits, and discrete circuitry.

The processor 340 is also capable of executing other processes and programs resident in the memory 360, such as operations that receive and store data. The processor 340 can move data into or out of the memory 360 as required by an executing process. In certain embodiments, the processor 340 is configured to execute the one or more applications 362 based on the OS 361 or in response to signals received from external source(s) or an operator. Example, applications 362 can include an encoder, a decoder, a VR or AR application, a camera application (for still images and videos), a video phone call application, an email client, a social media client, a SMS messaging client, a virtual assistant, and the like. In certain embodiments, the processor 340 is configured to receive and transmit media content.

The processor 340 is also coupled to the I/O interface 345 that provides the electronic device 300 with the ability to connect to other devices, such as client devices 106-114. The I/O interface 345 is the communication path between these accessories and the processor 340.

The processor 340 is also coupled to the input 350 and the display 355. The operator of the electronic device 300 can use the input 350 to enter data or inputs into the electronic device 300. The input 350 can be a keyboard, touchscreen, mouse, track ball, voice input, or other device capable of acting as a user interface to allow a user in interact with the electronic device 300. For example, the input 350 can include voice recognition processing, thereby allowing a user to input a voice command. In another example, the input 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme. The input 350 can be associated with the sensor(s) 365 and/or a camera by providing additional input to the processor 340. In certain embodiments, the sensor 365 includes one or more inertial measurement units (IMUs) (such as accelerometers, gyroscope, and magnetometer), motion sensors, optical sensors, cameras, pressure sensors, heart rate sensors, altimeter, and the like. The input 350 can also include a control circuit. In the capacitive scheme, the input 350 can recognize touch or proximity.

The display 355 can be a liquid crystal display (LCD), light-emitting diode (LED) display, organic LED (OLED), active matrix OLED (AMOLED), or other display capable of rendering text and/or graphics, such as from websites, videos, games, images, and the like. The display 355 can be sized to fit within an HMD. The display 355 can be a singular display screen or multiple display screens capable of creating a stereoscopic display. In certain embodiments, the display 355 is a heads-up display (HUD). The display 355 can display 3D objects, such as a 3D point cloud.

The memory 360 is coupled to the processor 340. Part of the memory 360 could include a RAM, and another part of the memory 360 could include a Flash memory or other ROM. The memory 360 can include persistent storage (not shown) that represents any structure(s) capable of storing and facilitating retrieval of information (such as data, program code, and/or other suitable information). The memory 360 can contain one or more components or devices supporting longer-term storage of data, such as a read only memory, hard drive, Flash memory, or optical disc. The memory 360 also can contain media content. The media content can include various types of media such as images, videos, three-dimensional content, VR content, AR content, 3D point clouds, and the like.

The electronic device 300 further includes one or more sensors 365 that can meter a physical quantity or detect an activation state of the electronic device 300 and convert metered or detected information into an electrical signal. For example, the sensor 365 can include one or more buttons for touch input, a camera, a gesture sensor, an IMU sensors (such as a gyroscope or gyro sensor and an accelerometer), an eye tracking sensor, an air pressure sensor, a magnetic sensor or magnetometer, a grip sensor, a proximity sensor, a color sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, a color sensor (such as a Red Green Blue (RGB) sensor), and the like. The sensor 365 can further include control circuits for controlling any of the sensors included therein.

The electronic device 300 can create media content such as generate a virtual object or capture (or record) content through a camera. To transmit the media content to another device, the electronic device 300 can compress and encode the content. When preparing the media content to be transmitted, the electronic device 300 can project the point cloud into multiple patches. For example, a cluster of points of the point cloud can be grouped together and depicted as a patch in a 2D frame. A patch can represent a single attribute of the point cloud, such as geometry, color, and the like. Patches that represent the same attribute can be packed into individual 2D frames, respectively.

The 2D frames are then encoded to generate a bitstream. The frames can be encoded individually or together. During the encoding process additional content such as metadata, flags, occupancy maps, auxiliary information, and the like can be included in the bitstream. The electronic device 300 can encode the media content to generate a bitstream, such that the bitstream can be transmitted directly to another electronic device or indirectly such as through the network 102 of FIG. 1. Another electronic device, similar to the electronic device 300, can receive a bitstream directly from the electronic device 300 or indirectly such as through the network 102 of FIG. 1.

Similarly, when decoding media content included in a bitstream that represents a 3D point cloud, the electronic device 300 decodes the received bitstream into frames. In certain embodiments, the decoded bitstream also includes an occupancy map. The decoded bitstream can also include one or more flags, or quantization parameter size, auxiliary information, or any combination thereof. A geometry frame can include pixels that indicate geographic coordinates of points of the point cloud in 3D space. Similarly, a color frame can include pixels that indicate the RGB color of each geometric point in 3D space. In certain embodiments, an individual frame can include points from different layers. In certain embodiments, after reconstructing the 3D point cloud, the electronic device 300 can render the 3D point cloud in three dimensions via the display 355.

Although FIGS. 2 and 3 illustrate examples of electronic devices, various changes can be made to FIGS. 2 and 3. For example, various components in FIGS. 2 and 3 could be combined, further subdivided, or omitted and additional components could be added according to particular needs. As a particular example, the processor 340 could be divided into multiple processors, such as one or more central processing units (CPUs) and one or more graphics processing units (GPUs). In addition, as with computing and communication, electronic devices and servers can come in a wide variety of configurations, and FIGS. 2 and 3 do not limit this disclosure to any particular electronic device or server.

Figure 4:
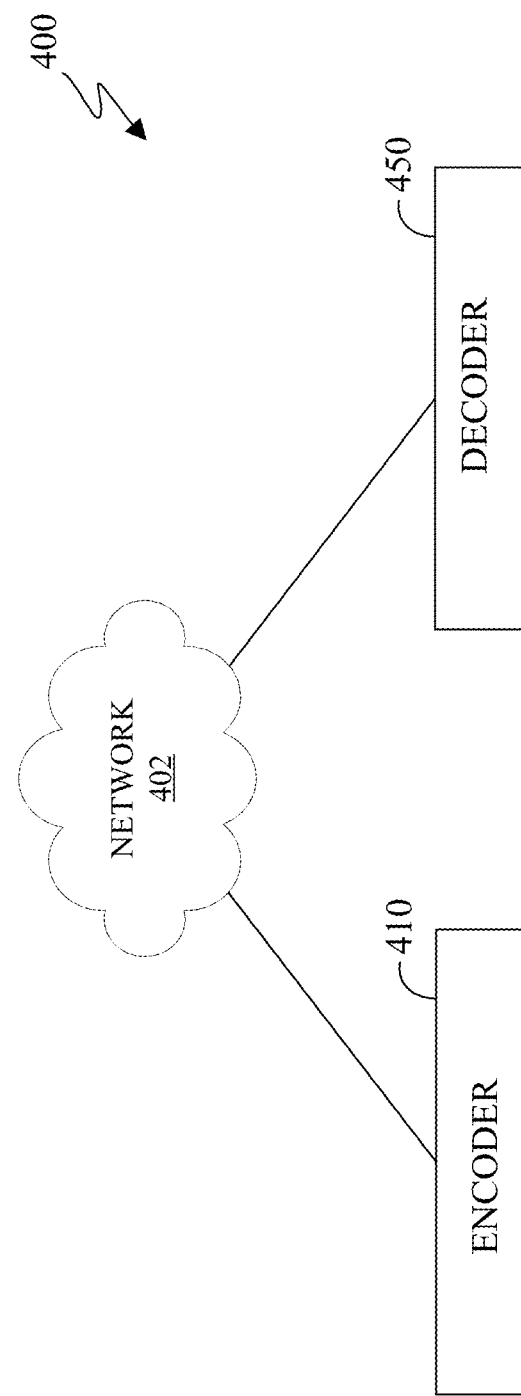
FIG. 4 illustrates a block diagram of an example environment-architecture in accordance with an embodiment of this disclosure.

FIG. 4 illustrates a block diagram of an example environment-architecture 400 for storage of EVC decoder configuration information in accordance with an embodiment of this disclosure. The embodiment of FIG. 4 is for illustration only. Other embodiments can be used without departing from the scope of this disclosure.

As shown in FIG. 4, the example environment-architecture 400 includes an encoder 410 and a decoder 450 in communication over a network 402. The network 402 can be the same as or similar to the network 102 of FIG. 1. In certain embodiments, the network 402 represents a "cloud" of computers interconnected by one or more networks, where the network is a computing system utilizing clustered computers and components that act as a single pool of seamless resources when accessed. Also, in certain embodiments, the network 402 is connected with one or more servers (such as the server 104 of FIG. 1, the server 200), one or more electronic devices (such as the client devices 106-116 of FIG. 1, the electronic device 300), the encoder 410, and the decoder 450. Further, in certain embodiments, the network 402 can be connected to an information repository (not shown) that contains media content that can be encoded by the encoder 410, decoded by the decoder 450, or rendered and displayed on an electronic device.

In certain embodiments, the encoder 410 and the decoder 450 can represent the server 104, one of the client devices 106-116 of FIG. 1, or another suitable device. The encoder 410 and the decoder 450 can include internal components similar to the server 200 of FIG. 2 and electronic device 300 of FIG. 3. In certain embodiments, the encoder 410 and the decoder 450 can be a "cloud" of computers interconnected by one or more networks, where each is a computing system utilizing clustered computers and components to act as a single pool of seamless resources when accessed through the network 402. In some embodiments, a portion of the components included in the encoder 410 or the decoder 450 can be included in different devices, such as multiple servers 104 or 200, multiple client devices 106-116, or other combination of different devices. In certain embodiments, the encoder 410 is operably connected to an electronic device or a server while the decoder 450 is operably connected to an electronic device. In certain embodiments, the encoder 410 and the decoder 450 are the same device or operably connected to the same device.

The encoder 410 receives media content from another device such as a server (similar to the server 104 of FIG. 1, the server 200 of FIG. 2) or an information repository (such as a database). The encoder 410 transmits frames representing the media content as an encoded bitstream. The bitstream can be transmitted to an information repository (such as a database) or an electronic device that includes a decoder (such as the decoder 450), or the decoder 450 itself through the network 402.

The decoder 450 can receive a bitstream that represents media content. The bitstreams can include data representing EVC decoder configuration information. In certain embodiments, the decoder 450 can decode the bitstream that includes the multiple frames and auxiliary information that are used when reconstructing the media content. The EVC decoder configuration information associated with one frame can indicate that the decoder is to reference auxiliary information from another frame when reconstructing the media content.

Figure 5:
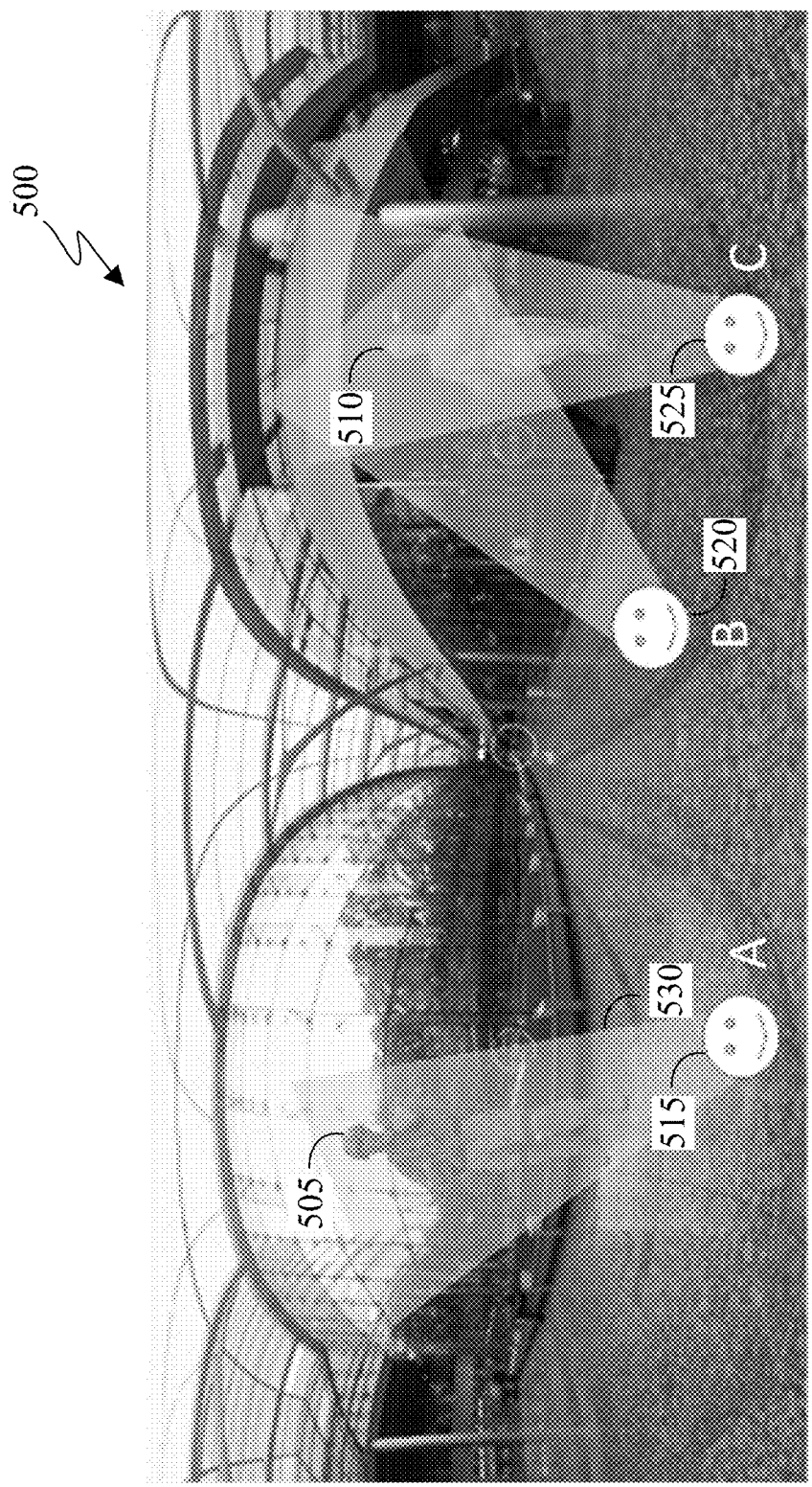
FIG. 5 illustrates an example three-dimensional scene in accordance with an embodiment of this disclosure.

FIG. 5 illustrates an example three-dimensional (3D) scene 500 in accordance with an embodiment of this disclosure. The embodiment of FIG. 5 is for illustration only and other embodiments could be used without departing from the scope of this disclosure.

As shown in FIG. 5, 3D scene 500 shows a first point cloud 505 and a second point cloud 510 inside a building. The building appears to have a glass ceiling that is located at the top of the 3D scene 500 and marble floors at the bottom of the 3D scene 500. At a center of the scene is a hallway line with glass walls on either side.

The first point cloud 505 is located on a left side of the 3D scene 500. The first point cloud 505 represents a man dressed in a camouflage military-style uniform. The man is holding a gun pointed down in his right hand and has his left hand grabbing his collar with a watch on his wrist.

The second point cloud 510 is located on the right side of the 3D scene 500. The second point cloud 510 represents a woman in a dress. The woman has her right arm down to her side and her left arm behind her back.

The 3D scene 500 includes a first user perspective 515, a second user perspective 520, and a third user perspective 525. The user perspective corresponds to a user's representative location and viewing direction with the 3D scene 500.

The first user perspective 515 is located at the bottom left side of the 3D scene 500. The first user perspective 515 has a viewing direction 530 towards the first point cloud 505. Based on the first user perspective 515, only a portion of the first point cloud 505 is visible. For example, the viewing direction of the first user perspective 530 is only viewing a front and left side of the first point cloud 505 above the knee area. The right and back sides of the point cloud are not visible from the first user perspective 530.

The second user perspective 520 is located at the bottom center side of the 3D scene 500. The second user perspective 520 has a viewing direction towards the second point cloud 510. Based on the second user perspective 520, the top half of the second point cloud 510 is visible above the waist. The second user perspective 520 does not have visibility to the bottom half of the second point cloud 510 and the back and left side of the second of the second point cloud 510. The first point cloud 505 is not visible from the second user perspective 520.

The third user perspective 525 is located at the bottom right side of the 3D scene 500. The third user perspective 525 is illustrated as being directed only to the second point cloud 510, but the first point cloud 505 is visible on the periphery of the third user perspective 525. The third user perspective 525 can see the entire front side of the second point cloud 510 and the front left side of the first point cloud 505. The back of the second point cloud 510 and the back right side of the first point cloud 505 are not visible from the third user perspective 525.

Figure 6:
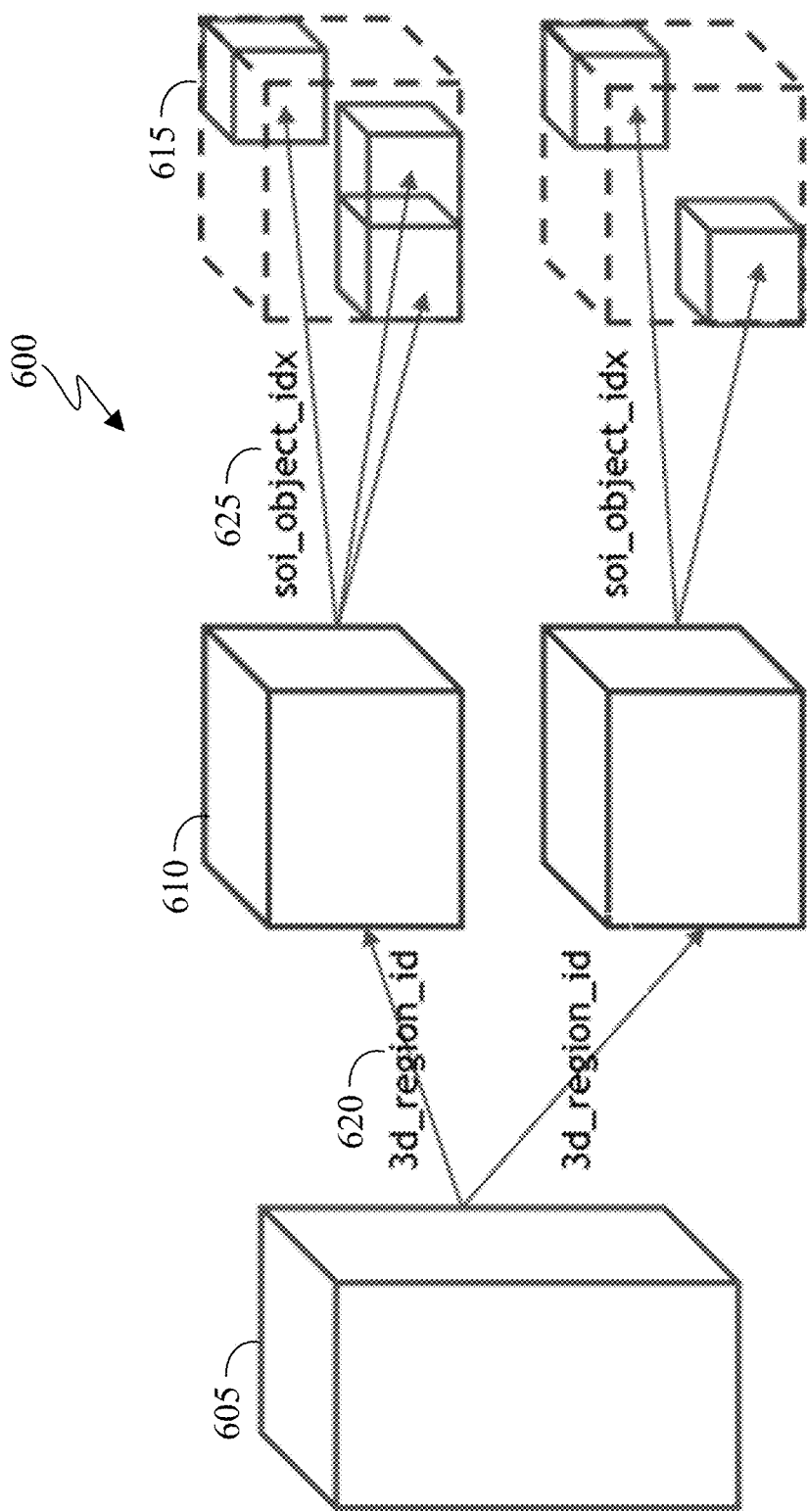
FIG. 6 illustrates an example overview of a storage structure based on hierarchical processing model in accordance with embodiments of this disclosure.

FIG. 6 illustrates an example overview of a storage structure 600 based on hierarchical processing model in accordance with embodiments of this disclosure. The embodiment of FIG. 6 is for illustration only and other embodiments could be used without departing from the scope of this disclosure.

The storage structure 600 includes a point cloud 605, PC regions 610, and PC objects 615. The point cloud 605 is the full data structure. The point cloud 605 can be represented by the first point cloud 505 and the second point cloud 510.

The PC regions 610 are subsection of the point cloud 605. The Static 3D spatial PC regions 610 in a point cloud 605 and their respective associated tracks are signaled in a VPCCSpatialRegionsBox. Each 3D spatial regions can include all the 3D points reconstructed from the bitstream in the associated track groups. Each 3D spatial regions with different 3D_region_id 620 may overlap each other in 3D space. The 3D_region_id 620 is the identification of the 3D region of the point cloud 605. A location of a PC region can be identified based on the 3D_region_id 620.

The PC object 615 can represent objects on the point cloud 605. For example, in the first point cloud 505, object could represent the gun, the right hand, the left hand, the head, the legs, the arms, the torso, the feet, etc. The PC object 615 is identified based on the location of the object in the point cloud 605.

If volumetric annotation SEI messages family is carried by the atlas sub-bitstream, VPCCSpatialRegionsBox shall be present and the list of the value of the object index in the associated track groups, that is defined by the scene object information SEI messages, shall be present.

The scene object information SEI message and object label information SEI message from the volumetric annotation SEI messages family might be signaled in a VPCCSpatialRegionsBox. If signaled, the objects in the associated track groups are associated with properties indicated by the SEI messages through the object index.

NALUMapEntry specified in ISO/IEC 14496-15 [14496-15] shall be present in the V-PCC track when VPCCSpatialRegionsBox is present. This document uses NALUMapEntry as specified in ISO/IEC14496-15 with the following additional specifications: (1) The NALUMapEntry, when present, is used to assign an identifier, called groupID, to each atlas NAL units. (2) The NALUMapEntry, when present, may or may not be linked to a sample group description setting the grouping_type_parameter of the SampleToGroupBox of type 'nalm'. Consequently, A SampleToGroupBox of type 'nalm' may or may not use version 0 of the box. The following syntax could be used to express the storage structure 600.

Box Types: 'vpsr'
Container: VPCCSampleEntry ('vpc1' or 'vpcg')
Mandatory: No
Quantity: Zero or one

```
aligned(8) class VPCCSpatialRegionsBox extends FullBox('vpsr',0,0) {
    unsigned int(16) num_regions;
    for (i=0; i < num_regions; i++) {
        3DSpatialRegionStruct(1);
        unsigned int(8) num_track_groups;
        for (j=0; j < num_track_groups; j++) {
            unsigned int(32) track_group_id;
            unsigned int(16) nal_group_id;
        }
        unsigned int(8) num_soi_object_idx;
        for (k=0; k< num_soi_object_idx; k++) {
            unsigned int(8) length_soi_object_idx;
            unsigned int(length_soi_object_idx * 8) soi_object_idx;
        }
    }
    unsigned int(8) numOfSeis;
    for (i=0; i < numOfSeis; i++) {
        unsigned int(16) seiLength;
        nal_unit(seiLength) sei;
    }
}
```

Where num_regions indicates the number of 3D spatial regions in the point cloud. num_track_groups indicates the number of track groups associated with a 3D spatial region. track_group_id identifies the track group for the tracks which carry the V-PCC components for the associated 3D spatial region. nal_group_id identifies the atlas NAL units containing atlas tile group data for the associated track group for the tracks which carry the V-PCC components. The value of nal_group_id shall be equal to the groupID in one of the entries of NALUMapEntry in the V-PCC track. The value of nal_group_id shall be greater than 0. A NAL unit being mapped to groupID 0 by a NALUMapEntry implies that the NAL unit is required for decoding any atlas tile group in the same atlas frame as this NAL unit. A number, num_soi_object_idx, of objects indicates the number of different values of the object index defined by scene object information SEI messages in the bitstreams from the track groups associated with each 3D spatial regions. An object length, length_soii_object_idx, indicates the length of values of each object index in bytes. An object value, soi_object_idx 625, indicates the value of each object index defined by the object scene information SEI messages. numOfSeis specifies the number of sei signaled. seiLength indicates the size, in bytes, of the sei field. The length field includes the size of both the NAL unit header and the NAL unit payload but does not include the length field itself sei is a NAL unit of type NAL_PREFIX_SEI, or NAL_SUFFIX_SEI contains scene object information or object label information SEI messages. If these SEI messages are not carried by atlas sub-bitstream, then the SEIs in sei applied to entire V-PCC bitstream. Otherwise, the SEIs in sei indicate an initial value of these SEI messages and may be updated by the SEI messages carried by atlas sub-bitstream.

If the V-PCC track has an associated timed-metadata track with a sample entry type 'dysr', 3D spatial regions defined for the point cloud stream carried by the V-PCC track are considered as dynamic regions (i.e., the spatial region information may dynamically change over time). If objects are added or removed in the middle of the bitstream by scene object information SEI messages and VPCCSpatialRegionsBox is present in the sample entry then DynamicSpatialRegionSample shall be present. The associated timed-metadata track shall contain a 'cdsc' track reference to the V-PCC track carrying the atlas stream. The following syntax can be used to express a dynamic region.

```
aligned(8) DynamicSpatialRegionSample( ) {
    unsigned int(16) num_regions;
    for (i=0; i < num_regions; i++) {
        3DSpatialRegionStruct(dimensions_included_flag);
        unsigned int(8) num_soi_object_idx_added;
        for (j=0; j < num_soi_object_idx_added; j++) {
            unsigned int(8) length_soi_object_idx;
            unsigned int(length_soi_object_idx * 8) soi_object_idx;
        }
        unsigned int(8) num_soi_object_idx_cancelled;
        for (j=0; j < num_soi_object_idx_cancelled; j++) {
            unsigned int(8) length_soi_object_idx;
            unsigned int(length_soi_object_idx * 8) soi_object_idx;
        }
    }
}
``` num_regions indicates the number of 3D spatial regions signaled in the sample. This may not necessarily be equal to the total number of available regions. Only spatial regions whose position and/or dimensions are being updated are present in the sample. If dimensions_included_flag is set to 0, this implies that the dimensions of the region have been previously signaled in a previous instance of a 3DSpatialRegionStruct with the same 3d_region_id, either in a previous sample or in the sample entry. A number of objects added, num_soi_object_idx_added, indicates the number of values of the object index newly added by scene object information SEI messages from the atlas sub-bitstreams carried by referenced V-PCC track. A number of objects cancelled, num_soi_object_idx_cancelled, indicates the number of previously defined values of the object index cancelled by scene object information SEI messages from the atlas sub-bitstreams carried by referenced V-PCC track. An object length, length_soi_object_idx, indicates the length of each soi_object_idx in bytes. An object value, soi_object_idx, indicates the value of the object index defined by the object scene information SEI messages.

Figure 7:
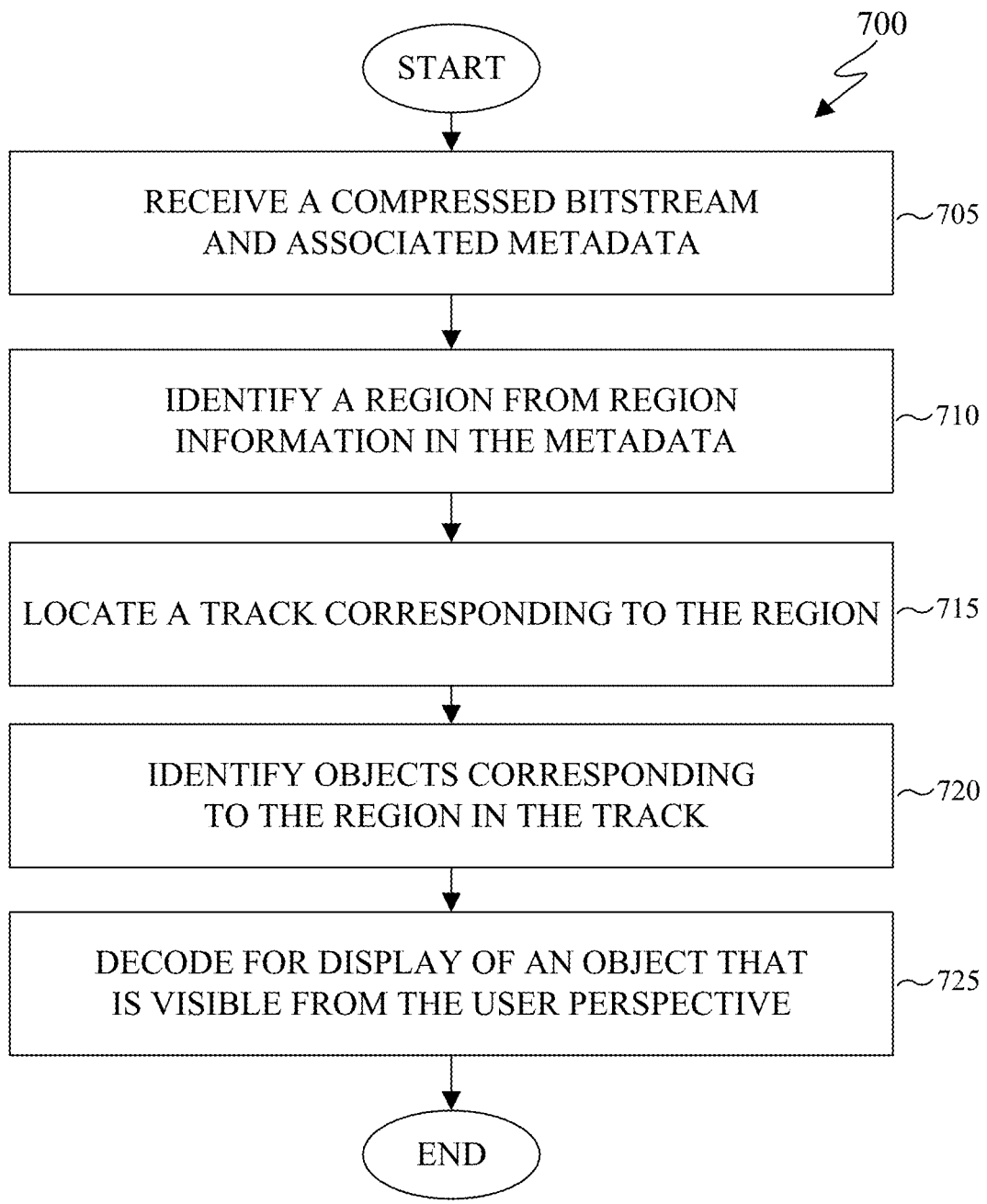
FIG. 7 illustrates example method for decoding partial access metadata for video-based point cloud compression data in accordance with an embodiment of this disclosure.

FIG. 7 illustrates example method 700 for decoding partial access metadata for video-based point cloud compression data in accordance with an embodiment of this disclosure. The method 700 can be performed by the server 104 or any of the client devices 106-116 of FIG. 1, the server 200 of FIG. 2, the electronic device 300 of FIG. 3, the decoder 450 of FIG. 4, or any other suitable device or system. For ease of explanation, the method 400 is described as being performed by the decoder 450 of FIG. 4.

In step 705, the decoder 450 receives a compressed bitstream and associated metadata. The compressed video bitstream can be received from an encoder, such as encoder 410 shown in FIG. 4. The compressed video bitstream can have metadata including a video decoder configuration record. The metadata can include region information when a point cloud is split into regions. The region information, 3d_region_id 620, can include information for identifying a position of the region within the point cloud 605. The compressed bitstream could include a supplemental enhancement information (SEI) message. The objects corresponding to the region of the point cloud can be defined in the SEI message based on a number of the objects, an object length, and an object value. The number of objects indicates a total number of objects in the region. The object length indicates a length of a respective object. The object value indicates an index of a respective object. The decoder 450 can also receive a user's perspective including a user location and a viewing direction.

In step 710, the decoder 450 can identify a region from region information in the metadata. The region can be identified based on the user's perspective. The object is determined to be visible from the user perspective based on an object value of the object corresponding to a location present in or bordering the region in line with the user perspective. For example, the point cloud 405 can be split into a top region and a bottom region. The region information can be used to determine whether any portion of the region is visible within the user perspective.

In step 715, the decoder 450 can locate a track corresponding to the region. Each region is stored in a track of the compressed bitstream. In step 720, the decoder 450 can identify objects corresponding to the region in the track. The track can include object information, soi_object_idx, to identify objects within the region that are visible based on the user perspective.

In step 725, the decoder 450 can decode for display of an object that is visible from the user perspective. The video frames of the compressed video bitstream are decoded based on the objects whose object ID corresponds to the user perspective. The decoded video bitstream can be stored or displayed on the decoder 450. Only the objects that are visible are decoded. Objects and regions of a point cloud that are not visible from a user's perspective are not decoded. In certain embodiments, non-visible adjacent objects, including objects in otherwise non-visible regions, could be decoded but not displayed. This could reduce processing time if the user perspective is moving.

In certain embodiments, the decoder 450 can identify a dynamic region from the metadata. The dynamic region information can indicate an updated track corresponding to the region information. A new object can be identified in the updated track that is visible from the user perspective. The new object is decoded for display. In certain embodiments, the dynamic region information indicates a deleted object. The deleted object is identified from the track corresponding to an object currently displayed and is removed from the display. The deleted object can be defined in the SEI message based on a number of canceled objects, an object length, and an object value.

Although FIG. 7 illustrates one example of a method 700 for storage of EVC decoder configuration information, various changes may be made to FIG. 7. For example, while shown as a series of steps, various steps in FIG. 7 could overlap, occur in parallel, or occur any number of times.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A decoding device for generating partial access metadata for video-based point cloud compression, the decoding device comprising:
   a communication interface configured to receive a compressed bitstream and metadata related to the compressed bitstream;
   a processor operably coupled to the communication interface, wherein the processor is configured to:
   identify, in the metadata, region information that indicates a region of a point cloud based on a user perspective;
   locate a track of the compressed bitstream that corresponds to the region information;
   identify, in the track, objects corresponding to the region of the point cloud; and
   decode for display of an object, included in the objects identified in the track, that is visible from the user perspective.

2. The decoding device of claim 1, wherein:
   the compressed bitstream includes a supplemental enhancement information (SEI) message, and
   the objects corresponding to the region of the point cloud are defined in the SEI message based on a number of the objects, a length of an object identifier, and a value of object identifiers.

3. The decoding device of claim 2, wherein the number of the objects indicates a total number of objects in the region, the length of the object identifier indicates a length of a respective object identifier, and the value of object identifiers indicates an identifier of a respective object.

4. The decoding device of claim 2, wherein the processor is configured to determine whether the object is visible from the user perspective based on a three-dimensional region corresponding to a location present in or bordering the region in line with the user perspective.

5. The decoding device of claim 1, wherein the processor is further configured to:
   identify, in the metadata, dynamic region information that indicates an updated track corresponding to the region information;
   identify a new object in the updated track that is visible from the user perspective; and
   decode the new object for display.

6. The decoding device of claim 1, wherein the processor is further configured to:
   identify, in the metadata, dynamic region information that indicates an updated track corresponding to the region information;
   identify, in the track, a deleted object corresponding an object currently displayed; and
   remove the deleted object from display.

7. The decoding device of claim 6, wherein:
   the compressed bitstream includes a supplemental enhancement information (SEI) message, and
   the deleted object is defined in the SEI message based on a number of canceled objects, a length of an object identifier, and a value of object identifiers.

8. A method for point cloud decoding, the method comprising:
   receiving, using a communication interface, a compressed bitstream and metadata related to the compressed bitstream;
   identifying, using a processor operably coupled to the communication interface, region information in the metadata that indicates a region of a point cloud based on a user perspective;
   locating a track of the compressed bitstream that corresponds to the region information;
   identifying, in the track, objects corresponding to the region of the point cloud; and
   decoding for display of an object, included in the objects identified in the track, that is visible from the user perspective.

9. The method of claim 8, wherein:
   the compressed bitstream includes a supplemental enhancement information (SEI) message, and
   the objects corresponding to the region of the point cloud are defined in the SEI message based on a number of the objects, a length of an object identifier, and a value of object identifiers.

10. The method of claim 9, wherein the number of the objects indicates a total number of objects in the region, the length of the object identifier indicates a length of a respective object identifier, and the value of object identifiers indicates an identifier of a respective object.

11. The method of claim 9, further comprising:
    determining whether the object is visible from the user perspective based on a three-dimensional region corresponding to a location present in or bordering the region in line with the user perspective.

12. The method of claim 8, further comprising:
    identifying, in the metadata, dynamic region information that indicates an updated track corresponding to the region information;
    identifying a new object in the updated track that is visible from the user perspective; and
    decoding the new object for display.

13. The method of claim 8, further comprising:
identifying, in the metadata, dynamic region information that indicates an updated track corresponding to the region information;
identifying, in the track, a deleted object corresponding an object currently displayed; and
removing the deleted object from display.

14. The method of claim 13, wherein:
the compressed bitstream includes a supplemental enhancement information (SEI) message, and
the deleted object is defined in the SEI message based on a number of canceled objects, a length of an object identifier, and a value of object identifiers.

15. A non-transitory computer readable medium embodying a computer program, the computer program comprising computer readable program code that, when executed by a processor of an electronic device, causes the electronic device to:
receive a compressed bitstream and metadata related to the compressed bitstream;
identify, in the metadata, region information that indicates a region of a point cloud based on a user perspective;
locate a track of the compressed bitstream that corresponds to the region information;
identify, in the track, objects corresponding to the region of the point cloud; and
decode for display of an object, included in the objects identified in the track, that is visible from the user perspective.

16. The non-transitory computer readable medium of claim 15, wherein:
the compressed bitstream includes a supplemental enhancement information (SEI) message, and
the objects corresponding to the region of the point cloud are defined in the SEI message based on a number of the objects, a length of an object identifier, and a value of object identifiers.

17. The non-transitory computer readable medium of claim 16, wherein the number of the objects indicates a total number of objects in the region, the length of the object identifier indicates a length of a respective object identifier, and the value of object identifiers indicates an identifier of a respective object.

18. The non-transitory computer readable medium of claim 16, wherein the computer readable program code that, when executed by the processor of the electronic device, further causes the electronic device to:
determine whether the object is visible from the user perspective based on a three-dimensional region corresponding to a location present in or bordering the region in line with the user perspective.

19. The non-transitory computer readable medium of claim 15, wherein the computer readable program code that, when executed by the processor of the electronic device, further causes the electronic device to:
identify, in the metadata, dynamic region information that indicates an updated track corresponding to the region information;
identify a new object in the updated track that is visible from the user perspective; and
decode the new object for display.

20. The non-transitory computer readable medium of claim 15, wherein the computer readable program code that, when executed by the processor of the electronic device, further causes the electronic device to:
identify, in the metadata, dynamic region information that indicates an updated track corresponding to the region information;
identify, in the track, a deleted object corresponding an object currently displayed; and
remove the deleted object from display.

* * * * *